Sept. 13, 1938.  T. H. SHELTON  2,130,292
SWEEP RAKE
Filed March 15, 1937   2 Sheets-Sheet 1
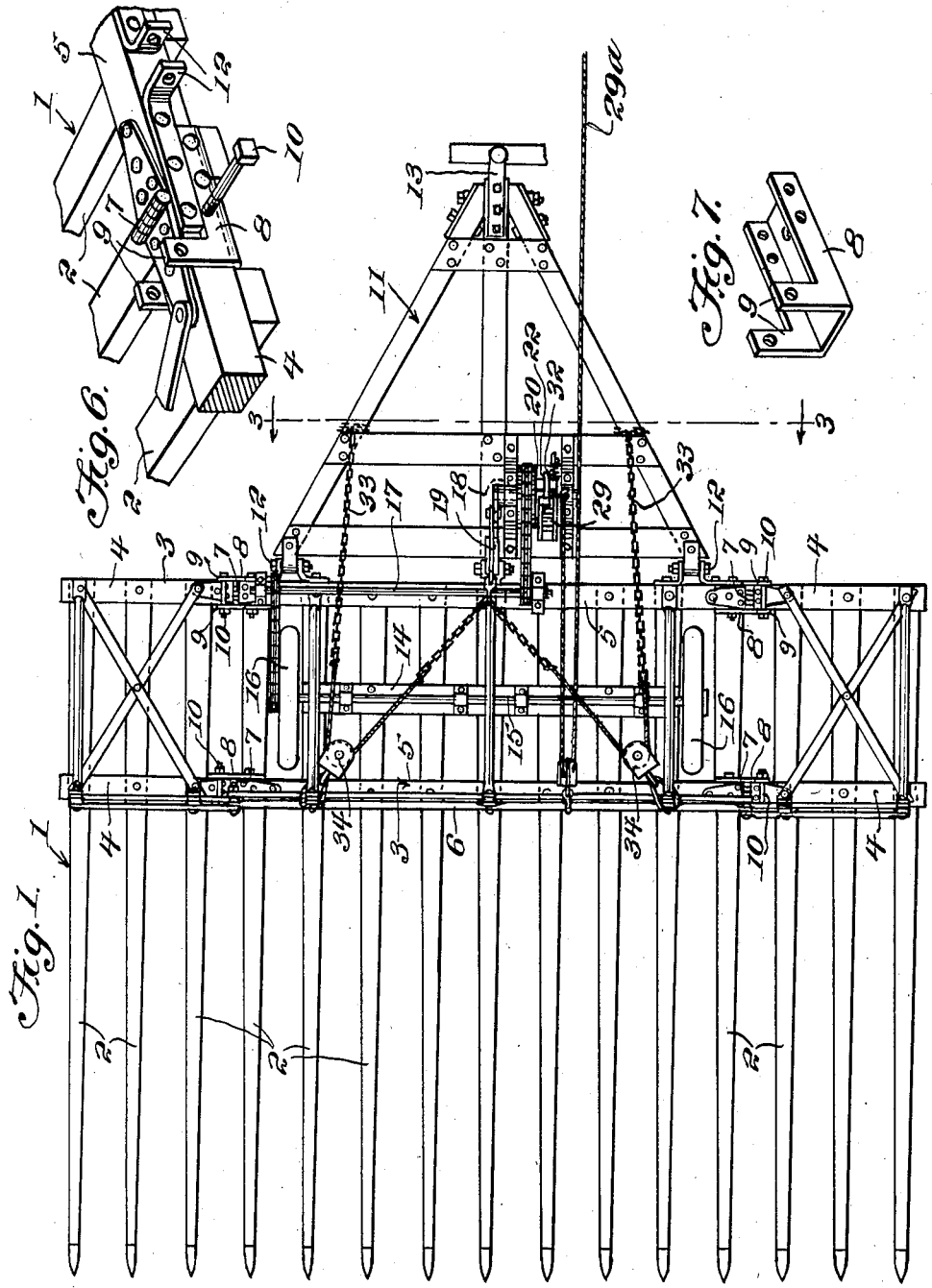

Sept. 13, 1938.　　　T. H. SHELTON　　　2,130,292
SWEEP RAKE
Filed March 15, 1937　　　2 Sheets-Sheet 2
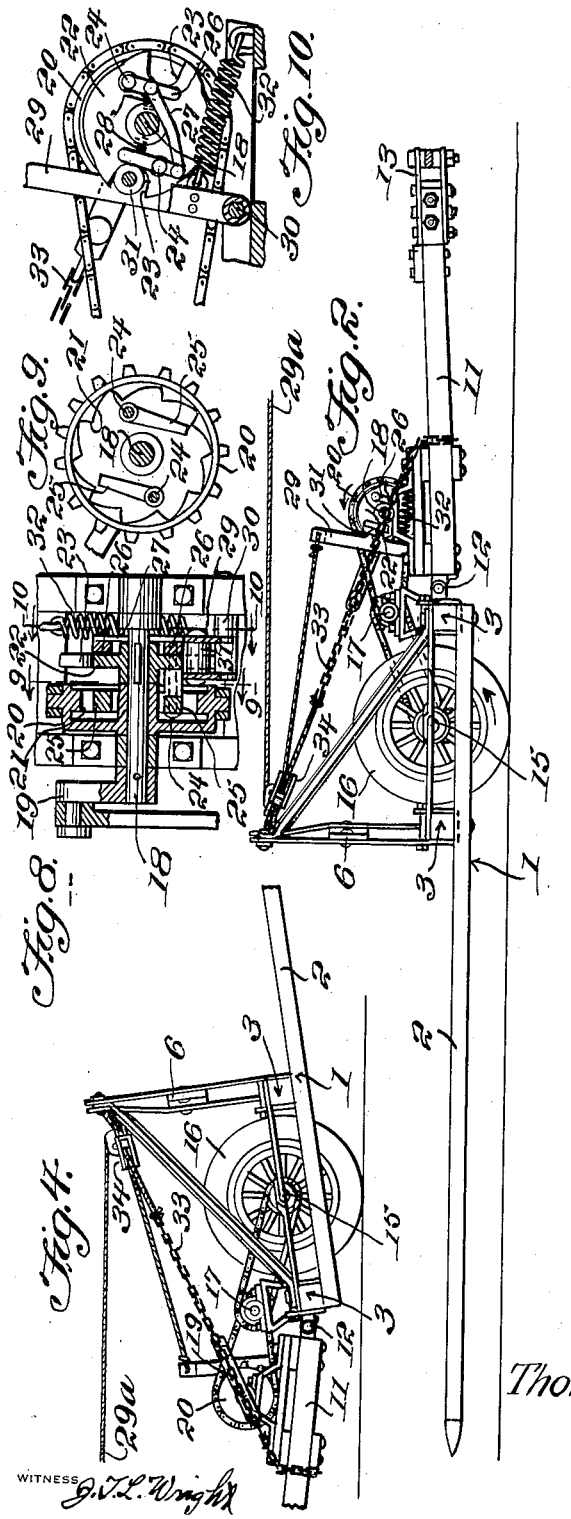
Thomas Harold Shelton
INVENTOR Patented Sept. 13, 1938

2,130,292

UNITED STATES PATENT OFFICE 2,130,292

SWEEP RAKE

Thomas Harold Shelton, Eugene, Oreg.

Application March 15, 1937, Serial No. 131,071

1 Claim. (Cl. 56—27)

This invention relates to sweep rakes of the wheel type and has for the primary object the provision of a device of this character which may be easily and quickly coupled to a tractor or similar device for propulsion in advance of the latter and which may be caused to assume either raking or load-carrying positions with minimum effort on the part of the operator.

Another object of this invention is the provision of means which will permit sections of the rake to be readily folded to decrease the width of the rake so that it may pass easily through a gateway.

With these and other objects in view, this invention consists in certain novel features of construction, combination and arrangement of parts to be hereinafter more fully described and claimed.

For a complete understanding of my invention, reference is to be had to the following description and accompanying drawings, in which, Figure 1 is a top plan view illustrating a sweep rake constructed in accordance with my invention.

Figure 2 is a side elevation illustrating the same.

Figure 3 is a sectional view taken on the line 3—3 of Figure 1.

Figure 4 is a fragmentary side elevation illustrating a rake in non-raking position.

Figure 5 is a fragmentary end view, partly in section, showing the rake folded.

Figure 6 is a fragmentary perspective view showing means for holding the sections of the rake in extended position.

Figure 7 is a perspective view of a bracket.

Figure 8 is a detail sectional view illustrating a clutch mechanism.

Figure 9 is a sectional view taken on the line 9—9 of Figure 8.

Figure 10 is a sectional view taken on the line 10—10 of Figure 8.

Referring in detail to the drawings, the numeral 1 indicates the rake head composed of a plurality of relatively spaced teeth 2 connected by cross members 3 each consisting of end and intermediate sections 4 and 5. The rake head 1 also includes a vertically disposed railing 6 secured to one of the members 3 and acting as an abutment for the hay to back against when taken up by the teeth. The railing 6 is composed of sections corresponding to the sections of the member 3 to which it is connected. The sections of the railing are detachably connected so that the end sections of the members 3 may be folded in the direction of the intermediate section thereby decreasing the width of the rake head so that the latter may move through comparatively small spaces.

The sections 4 and 5 of the members 3 are connected by hinges 7 and the sections 5 have secured thereto brackets 8 having upstanding apertured portions 9. The brackets 8 extend under the sections 4 to prevent said sections from swinging downwardly below a plane of the sections 5. Bolts 10 are passed through the apertured extensions 9 and overlie the sections 4 to prevent said sections 4 from swinging upwardly relative to the sections 5. To fold the rake head it is only necessary to remove the bolts 10 and swing the sections 4 upwardly bringing certain sections of the railing in contact with the teeth connected with the sections 5 of the members 3, as shown in Figure 5.

A coupling frame 11 is hinged to the rear end of the rake head, as shown at 12, and is of substantially triangular shape, the apex thereof being provided with a coupling device 13 so that the coupling frame may be readily attached to the forward end of a tractor or similar device so that the rake head may be caused to travel in advance of the tractor.

A member 14 is secured to certain of the teeth and is located between the members 3 and has secured thereto an axle 15 on which ground wheels 16 are journaled. A shaft 17 is journaled on one of the members 3 and is connected to one of the ground wheels 16 by means of an endless chain so that rotation of the ground wheel will rotate the shaft 17. The coupling frame 11 has journaled thereon a shaft 18 to which is secured a crank 19.

A sprocket gear 20 is journaled on the shaft 18 and is connected to a sprocket gear secured to the shaft 17 by a sprocket chain. The sprocket gear 20 has internal teeth 21.

A disc 22 is secured to the shaft 18 and has oppositely arranged notches 23 and also has journaled thereto shafts 24. The shafts 24 have secured thereto dogs 25 adapted to move into engagement with the internal teeth 21 of the sprocket gear. Arms 26 are secured to the shafts 24 and are connected by a link 27 to cause said arms to move in unison. The arms are spring pressed, as shown at 28, to position said arms over the notches 23. A control lever 29 is pivotally mounted to the frame 11, as shown at 30, and carries a roller 31 opposite the disc 22. The roller is capable of entering either of the notches 23. The lever 29 is urged into one position by a spring 32 or, in other words, the spring acts to position the lever 29 so that the roller 31 will enter either of the notches depending on which notch is opposite the roller. The roller entering the notch engages the arm adjacent thereto causing the shafts 24 to be rotated and thereby swing the dogs 25 out of engagement with the teeth 21 freeing the sprocket gear from the shaft 18 so that said sprocket gear may rotate without influencing the shaft 18. A rope or cable 29a is attached to the end of the lever 29 and leads to the tractor to which the coupling frame is attached whereby the lever 29 may be actuated from the tractor.

Flexible elements 33 are connected to the crank 19 and to the frame 11 and also pass over pulleys 34 secured to the railing of the rake head. The crank when in one position will lower the teeth into raking position and the crank when in a second position will elevate the teeth, as shown in Figure 4, for the purpose of carrying on the teeth the hay gathered by the teeth when in raking position. The different positions of the crank are indicated in Figure 4 and the crank is held in these different positions by the roller 31 engaging in one or the other of the notches 23. To move the crank from one position to the other, the lever 29 is swung on its pivot to move the roller 31 out of the notch occupied thereby which connects the sprocket gear 20 to the shaft 18 so that the forward movement of the rake will bring about either raising or lowering of the teeth or cause the teeth to assume either raking or load-carrying position.

What is claimed is:

A sweep rake comprising a rake head including a plurality of spaced rake teeth and a vertically disposed railing arranged transversely of the teeth, wheels for supporting said rake head, a coupling frame hinged to the rake head and of substantially triangular shape, means for coupling the coupling frame to a tractor, a power shaft journaled on the rake head and connected to one of the wheels for rotation thereby, a crank shaft journaled on the coupling frame, means connecting the crank shaft to the rake head for raising and lowering the teeth thereof, and a clutch mechanism connecting the crank shaft to the power shaft and comprising a sprocket gear having ratchet teeth and rotatably mounted on said crank shaft, a disc fixed on said crank shaft, pawls pivoted on said disc for engagement with said ratchet teeth whereby to connect said sprocket gear to said disc for rotation with said crank shaft, and a control lever pivoted on said coupling frame and adapted to coact with said disc for moving said pawls into and out of engagement with said ratchet teeth whereby to secure said crank shaft in one of two positions for supporting the rake teeth in raking position or in load-carrying position.

THOS. H. SHELTON.